(No Model.)

W. P. BETTENDORF.
METALLIC WHEEL.

No. 414,369. Patented Nov. 5, 1889.

Witnesses
M. W. Mortimer
H. A. Kennedy

Inventor
W. P. Bettendorf
By Phil. T. Dodge
Attorney

UNITED STATES PATENT OFFICE.

WILLIAM P. BETTENDORF, OF DAVENPORT, IOWA.

METALLIC WHEEL.

SPECIFICATION forming part of Letters Patent No. 414,369, dated November 5, 1889.

Application filed February 20, 1889. Serial No. 300,544. (No model.)

*To all whom it may concern:*

Be it known that I, WILLIAM P. BETTENDORF, of Davenport, in the county of Scott and State of Iowa, have invented certain Improvements in Metallic Wheels, of which the following is a specification.

The present invention relates to that class of metal wheels in which the spokes are riveted fast to the hub, and is designed more particularly for use in the wheels of hay-rakes and similar machines which require a very large number of spokes.

In practice it is found that the ordinary custom of extending the spokes directly through the hub to its central opening is objectionable, first, because of the difficulty of forming a sufficient number of spoke sockets or openings, and, second, because the oil or other lubricant finding its way into the interior of the spoke-sockets tends to a loosening of the spokes.

In my present invention I form the hub with the usual axial opening therethrough and with an external annular flange provided with spoke-receiving sockets, the flanges overhanging or projecting laterally in such manner that the spokes may be inserted from the exterior and headed on the interior of the flange outside of the hub proper.

Figure 1:
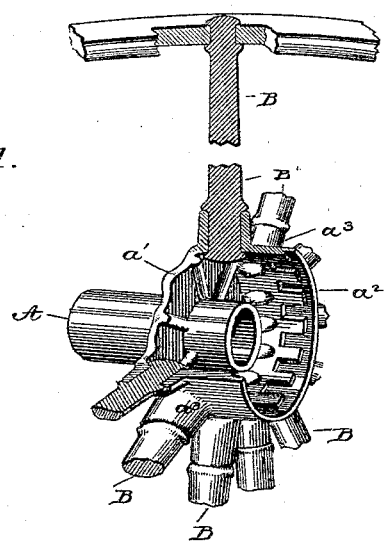
Figure 2:
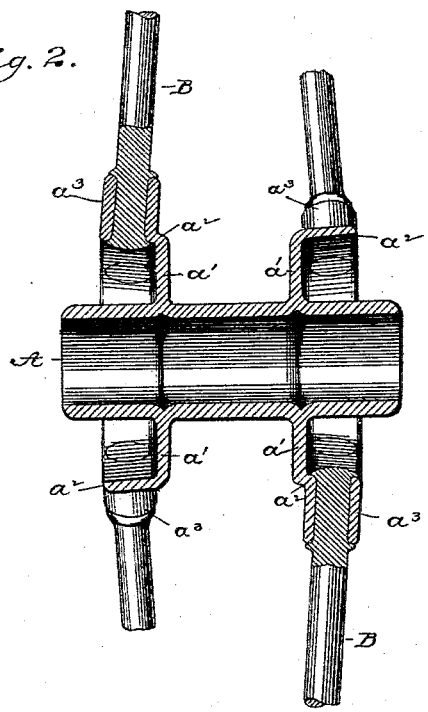
Figure 3:
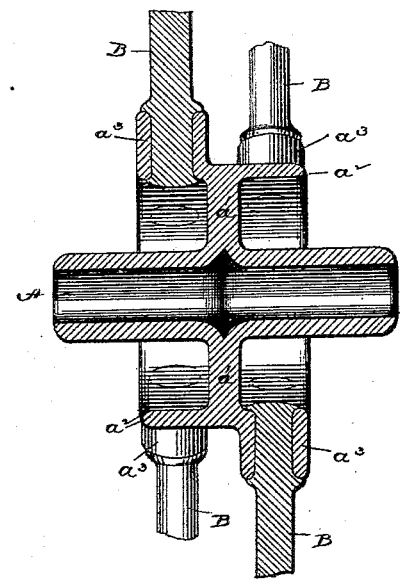

Referring to the accompanying drawings, Figure 1 is a perspective view of a hub and spokes in accordance with my invention, a portion of the hub being broken away to show the attachment of the spokes. Figs. 2 and 3 are axial sections through the hub in modified form.

Referring to Fig. 1, A represents the tubular hub or axle-box, $a'$ a flange extending radially therefrom, and $a^2$ an annular flange projecting laterally from the outer edge of the flange or web $a'$. This annular overhanging flange $a^2$ is formed with a series of radially-projecting spoke-receiving sockets $a^3$, which may be arranged in a straight circumferential line or in a zigzag or staggered line, as preferred. Each of the sockets is provided with a radial opening therethrough from the outside to the annular space or groove which extends between the flange and the outside of the hub proper.

B B represent the spokes, which are inserted into the sockets from the outside and upset tightly therein. Each spoke is headed or enlarged on the inner end, as shown, and is also commonly formed with a shoulder or enlargement bearing against the outer end of its sockets. It will be observed that the spokes terminate outside of the hub proper, and that there are no radial openings through which the oil can escape or gain access to the spokes.

Referring to Fig. 2, the hub or pipe-box A is provided near its opposite ends with two radial flanges $a'$, each of which sustains at the periphery an annular overhanging flange $a^2$. These flanges overhang in an outward direction—that is to say, toward the ends of the hub. They are each provided with a series of spoke-receiving sockets $a^3$, into which the spokes are inserted and secured as in the first example.

Referring to Fig. 3, A represents a hub or axle-box having a central radial flange $a'$, from which two annular flanges $a^2$ are inserted in opposite directions. Each of these annular or overhanging flanges is provided with a series of spoke-receiving sockets. The sockets will alternate on the two flanges, so that when the spokes are inserted they will stand in a zigzag or staggered line. The spokes are secured in this form of the hub in the same manner as in the others.

In each of the several forms the hub is cast complete in one piece.

It is to be noted that in each example of my hub there is an interrupted annular groove or channel between the outer surface of the hub proper and the interior surface of the overhanging flange. This interrupted channel permits the insertion of a tool to sustain the ends of the spokes during the upsetting operation by which they are fastened in place. It also permits the hub to be revolved without removal from the upsetting-machine to present the successive spokes to the tool, and, further, permits the seating of the clutches, pawls, and other devices used in agricultural machines to drive the axle within the overhanging flange of the hub.

In the hub shown in Fig. 1 (intended more particularly for self-dumping hay-rakes) the teeth $a^4$ are formed on the inside of the flange $a^2$ to engage with the customary axle-driving pawls, which under my construction of the hub may be mounted thereon so as to pass the inner ends of the spokes without interference.

Having thus described my invention, what I claim is—

1. The cast-metal hub having the central hub or pipe-box, the circumferential flange $a'$, and the overhanging flange $a^2$, with spoke-sockets thereon, in combination with the metal spokes seated in the sockets and enlarged at the outer and inner ends of the same.

2. The cast-metal hub comprising the tubular central portion, the radial flange, the overhanging flange with spoke-sockets, and the teeth on the inside of the overhanging flange, whereby the hub is adapted for the attachment of spokes to the overhanging flange and to permit the axle-driving devices to revolve past the inner ends of the spokes.

3. A metal hub having a central pipe-box and a flange encircling the same, said flange provided with spoke-receiving sockets and with teeth to engage an axle-driving pawl.

In testimony whereof I hereunto set my hand, this 17th day of January, 1889, in the presence of two attesting witnesses.

WM. P. BETTENDORF.

Witnesses:
GUSTAV N. MEVES,
L. H. THIELE.